United States Patent
Rahmann et al.

(10) Patent No.: US 11,920,566 B2
(45) Date of Patent: Mar. 5, 2024

(54) METHOD FOR REPAIRING A ROTOR BLADE OF A WIND TURBINE

(71) Applicant: Wobben Properties GmbH, Aurich (DE)

(72) Inventors: Uwe Rahmann, Großefehn (DE); Andre Kubasik, Aurich (DE); Michael Janssen, Aurich (DE); Manuel Schickel, Aurich (DE)

(73) Assignee: Wobben Properties GmbH, Aurich (DE)

( * ) Notice: Subject to any disclaimer, the term of this patent is extended or adjusted under 35 U.S.C. 154(b) by 260 days.

(21) Appl. No.: 17/429,892

(22) PCT Filed: Feb. 11, 2020

(86) PCT No.: PCT/EP2020/053392
§ 371 (c)(1),
(2) Date: Aug. 10, 2021

(87) PCT Pub. No.: WO2020/165123
PCT Pub. Date: Aug. 20, 2020

(65) Prior Publication Data
US 2022/0128040 A1 Apr. 28, 2022

(30) Foreign Application Priority Data
Feb. 11, 2019 (DE) .................... 10 2019 103 304.7

(51) Int. Cl.
*F03D 80/50* (2016.01)
*F03D 1/06* (2006.01)

(52) U.S. Cl.
CPC ........... *F03D 80/50* (2016.05); *F03D 1/0675* (2013.01); *F05B 2230/10* (2013.01); *F05B 2230/80* (2013.01)

(58) Field of Classification Search
CPC ......... F02D 80/50; F03D 1/0675; F03D 80/50
See application file for complete search history.

(56) References Cited

U.S. PATENT DOCUMENTS

| 9,770,791 B2* | 9/2017 | Hong .................. B64F 5/40 |
| 9,879,657 B2 | 1/2018 | Haupt et al. |
| 2011/0097211 A1* | 4/2011 | Rudling ............. B32B 27/30 416/229 R |
| 2012/0093659 A1 | 4/2012 | Muschke et al. |
| 2014/0154089 A1* | 6/2014 | Traser .................. C09J 5/08 156/60 |
| 2015/0056081 A1* | 2/2015 | De Waal Malefijt ................ B29C 65/7847 156/500 |

(Continued)

FOREIGN PATENT DOCUMENTS

| DE | 102016213206 A1 | 1/2018 |
| EP | 2927482 A1 | 10/2015 |

(Continued)

*Primary Examiner* — Long T Tran
(74) *Attorney, Agent, or Firm* — Seed IP Law Group LLP

(57) ABSTRACT

A method of repairing a wind turbine rotor blade, in particular an existing wind turbine rotor blade, that has erosion damage or transport damage. A first region is ablated into a surface or a surface coating of the rotor blade. An adhesive is applied to the ablated region, an erosion protection film is placed on the adhesive and the adhesive is cured.

5 Claims, 2 Drawing Sheets

(56) References Cited

U.S. PATENT DOCUMENTS

| | | | | |
|---|---|---|---|---|
| 2016/0046088 A1* | 2/2016 | Haag | ................ | F03D 80/55 |
| | | | | 427/535 |
| 2016/0208773 A1* | 7/2016 | Theile | ................ | B32B 25/10 |
| 2018/0304605 A1* | 10/2018 | Kuhn | ................ | B32B 27/38 |
| 2019/0193862 A1* | 6/2019 | Kinlen | ................ | B64D 15/20 |

FOREIGN PATENT DOCUMENTS

| | | |
|---|---|---|
| RU | 2641790 C2 | 1/2018 |
| WO | 2016189278 A1 | 12/2016 |
| WO | 2017114528 A1 | 7/2017 |
| WO | 2018051153 A1 | 3/2018 |

\* cited by examiner

METHOD FOR REPAIRING A ROTOR BLADE OF A WIND TURBINE

BACKGROUND

Technical Field

The present invention concerns a method of repairing a wind turbine rotor blade.

Description of the Related Art

The rotor blades of a wind turbine are exposed to environmental influences in operation of the wind turbine. Environmental influences and particles in the air cause erosion of the rotor blades. Such erosion can result in a change in the aerodynamic properties of the rotor blade. In addition erosion can lead to damage to the rotor blades, which have to be rectified.

Hitherto erosion damage to a wind turbine rotor blade was typically rectified by the damaged locations being filled by means of a filling compound, the filling compound being hardened and the filling compound being ground to the appropriate contour. Then a liquid (two-component) 2C edge protection lacquer was typically applied. A disadvantage with such a method however is that the edge protection material is exposed unprotected to the weather conditions in the processing operation. The 2C edge protection lacquer is typically applied by rolling it on, whereby it can happen that a plurality of layers of the material have to be applied by being rolled on in order to be able to achieve the desired layer thickness. If however one of the layers does not adhere particularly well that has adverse effects on the subsequent layers.

On the German patent application from which priority is claimed the German Patent and Trade Mark Office searched the following document: DE 10 2016 213 206 A1.

BRIEF SUMMARY

Provided is a method of repairing a wind turbine rotor blade, which permits more effective repair.

Provided is a method of repairing a wind turbine rotor blade, in particular an existing wind turbine rotor blade, that has erosion damage or transport damage. A first region is ablated into a surface or a surface coating of the rotor blade. An adhesive is applied to the ablated region, an erosion protection film is placed on the adhesive and the adhesive is cured.

According to an aspect of the present invention a repair or refurbishment of an erosion protection on a wind turbine rotor blade is effected in relation to rotor blades which were already in operation and which have erosion damage. For that purpose an IAL erosion protection film can be placed on the damaged regions or portions of the wind turbine rotor blade.

According to an aspect of the present invention a recess can be milled in the surface coating of the rotor blade. Optionally the erosion damage which is present can be roughened by grinding or levelled. The leading edge can be cleaned or cleared of dust and the rotor blade surface can be masked along the milled edges. Optionally a vacuum sealing tape can be applied. An IAL roller is fixed to the rotor blade and a pasty adhesive is applied. The IAL erosion film is applied to the adhesive and pressed uniformly thereagainst. A vacuum film is placed over the IAL erosion protection film and optionally a vacuum can be created. The adhesive can be cured by means of a heating mat and the heating mat, the vacuum film and the adhesive tapes can be removed.

As provided herein, erosion damage can be removed in a simple way. By virtue of application of the adhesive in that case the adhesive can be used as a levelling material. In that way it is possible to carry out both repair of the erosion damage and also replacement of an erosion protection for the rotor blade in one working operation.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
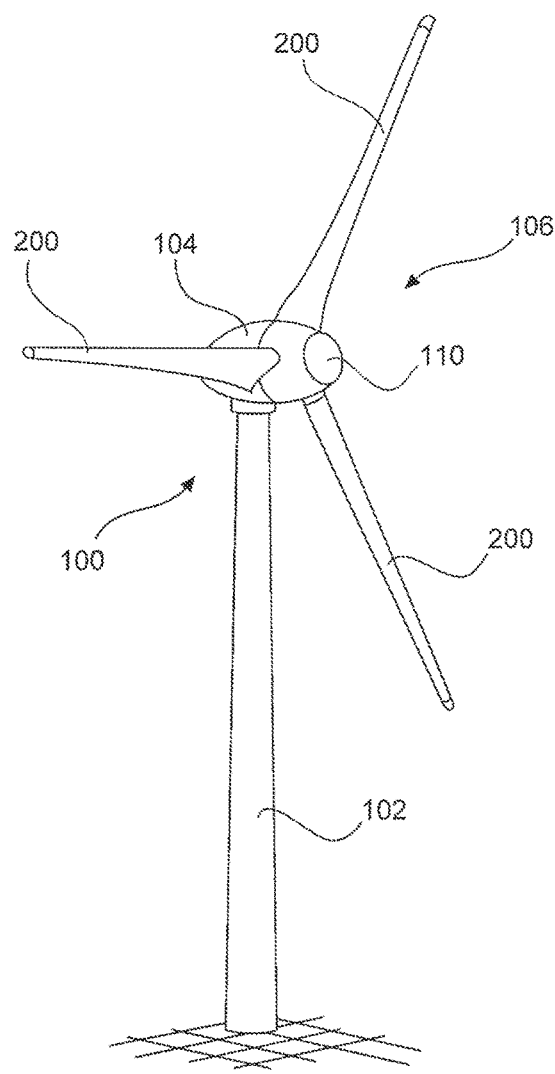
FIG. 1 shows a diagrammatic view of a wind turbine according to the invention, and FIGS. 2A and 2B each show a perspective sectional view of a wind turbine rotor blade.

FIG. 1 shows a diagrammatic view of a wind turbine according to the invention. FIG. 1 shows a wind turbine 100 comprising a tower 102 and a nacelle 104. A rotor 106 with three rotor blades 200 and a spinner 110 is arranged on the nacelle 104. The rotor 106 is caused to rotate by the wind in operation and thereby drives a generator in the nacelle 104.

Figure 2A:
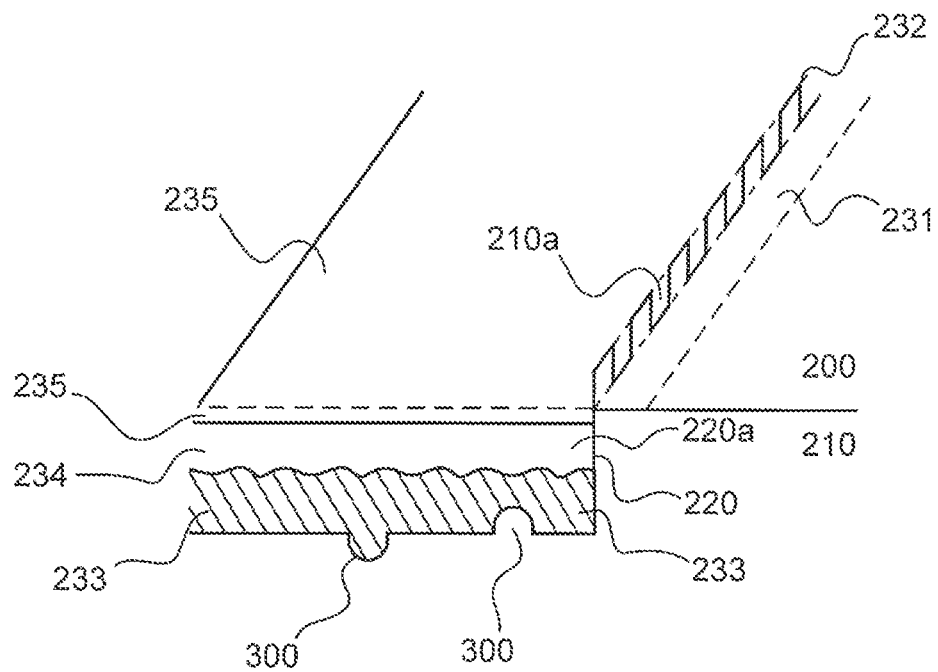

FIG. 2A shows a perspective sectional view of a wind turbine rotor blade. To repair damage 300 in or on the rotor blade 200, a recess 220 is milled in the surface or surface coating 210 of the rotor blade 200. That can be effected for example by means of a router guide unit. Damage, in particular erosion damage 300, in the region of the recess 220 can be subjected to further processing (roughening by grinding/levelling). Optionally a leading edge of the rotor blade 200 can be cleared of dust and cleaned. An adhesive tape 231 can be provided on the rotor blade surface along a milled edge 210a to mask the milled edge 210a. Optionally a vacuum sealing tape 232 can also be provided in that region.

Figure 2B:
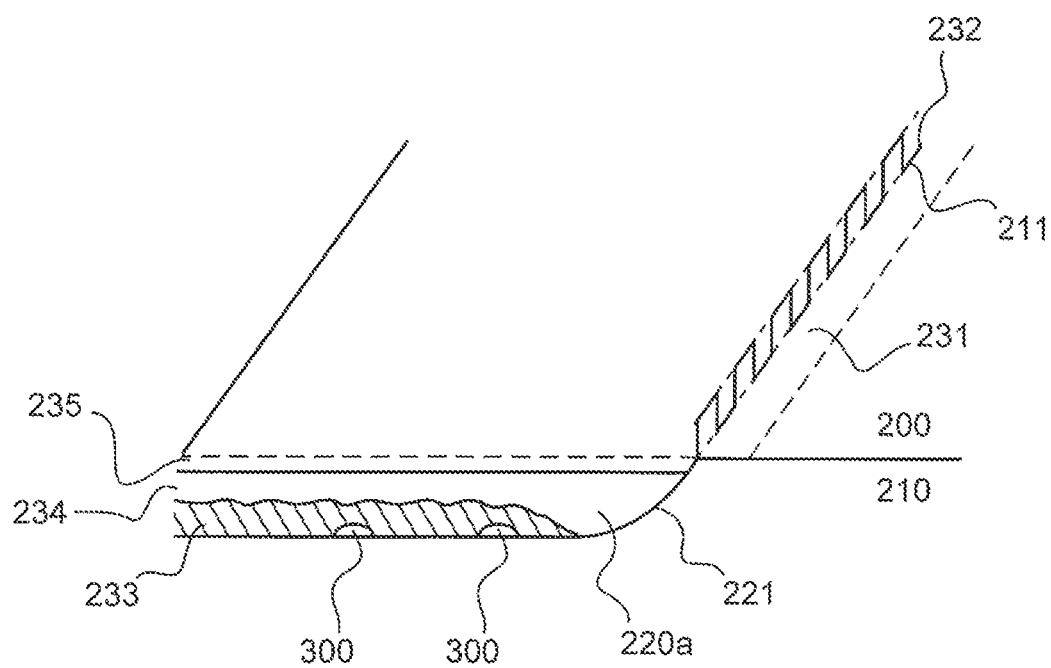

FIG. 2B shows a perspective sectional view of a wind turbine rotor blade. To repair the damage 300 in or on the rotor blade 200, the surface or the surface coating 210 of the rotor blade 200 is ground down in the adhesive region. Damage 300 in the ground-down region can be further processed by roughening and levelling. Optionally a leading edge of the rotor blade can be cleared of dust and cleaned. An adhesive tape 231 can be provided on the rotor blade surface along the ground edge in order to mask the ground edge 211. Optionally a vacuum sealing tape 230 can also be provided in that region.

During the repair method, the rotor blade is either still disposed on the nacelle of the wind turbine or the rotor blade was removed from the nacelle and is on the ground.

If the rotor blade is still on the nacelle a lift platform can be used to carry the workers upwardly. An end of an erosion protection film 234 can be fixed to the rotor blade 200 and adhesive 233 can be applied in the recess 222 or the ground-down or ablated region. The adhesive 233 is advantageous because it can level off unevenness caused by the damage 300. The adhesive 233 can represent a pasty adhesive. The erosion protection film 234 can then be applied. The erosion protection film 234 can be laid on the adhesive 233 and pressed against same. In that case care should be taken to ensure that the adhesive 233 and air inclusions are displaced from the center out towards both sides. A vacuum film 235 can be placed on the erosion protection film 234 and fixed by means of the vacuum sealing tape 232 to the milled edges 210a or the ground edges 211.

Optionally a vacuum can be created beneath the vacuum film 235 and the adhesive 233 can cure. A heating mat can be used to accelerate curing. After the adhesive or glue 233 is cured the heating mat, the vacuum film 235, the vacuum sealing tape 232 and the adhesive tape 231 can be removed. If there are projecting adhesive edges they can be smoothed off.

The rotor blade, if necessary, can then be re-fitted to the nacelle.

Accordingly durable erosion protection can be retrofitted to a wind turbine rotor blade in a simple way. That is particularly advantageous because in that way it is possible to considerably reduce future maintenance procedures.

Accordingly, both erosion damage can be rectified and also erosion protection can be renewed in one working operation.

The invention claimed is:

1. A method of repairing a wind turbine rotor blade which has erosion damage or transport damage, the method comprising:

ablating a first region into a surface or surface coating of the rotor blade forming an ablated region around the erosion damage or the transport damage, applying an adhesive as a levelling material in the ablated region of the rotor blade surface to level the ablated region, placing an erosion protection film on the adhesive, and curing the adhesive.

2. A method according to claim 1 wherein the adhesive is a pasty adhesive.

3. A method according to claim 1 wherein ablating the first region comprises milling out a recess in a surface or surface coating of the rotor blade or grinding the surface or the surface coating.

4. A method according to claim 1 further comprising:

applying a vacuum film to the erosion protection film and masking the vacuum film using a vacuum sealing tape at a milled edge or a ground edge, and creating a vacuum beneath the vacuum film and curing the adhesive.

5. A method according to claim 1 wherein the wind turbine rotor blade to be repaired is fixed to a rotor of a wind turbine during the repair.

* * * * *